Figure 1:
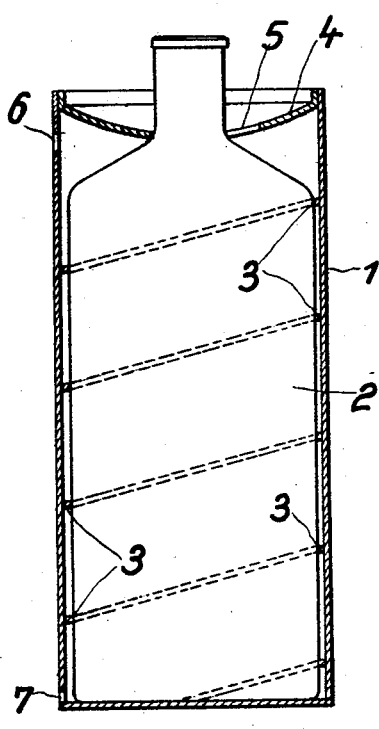

April 7, 1925.                                                          1,532,982
A. BLOM
REFRIGERATING ARRANGEMENT FOR DRINKS AND FOOD
Filed Nov. 16, 1923

Inventor:
ALBERT BLOM
By Munn & Co
Attorneys

Patented Apr. 7, 1925.

1,532,982

UNITED STATES PATENT OFFICE.

ALBERT BLOM, OF STOCKHOLM, SWEDEN.

REFRIGERATING ARRANGEMENT FOR DRINKS AND FOOD.

Application filed November 16, 1922. Serial No. 675,229.

*To all whom it may concern:*

Be it known that ALBERT BLOM, a subject of the King of Sweden, residing at Stockholm, Skeppargatan 14, Sweden, has invented certain new and useful Improvements in Refrigerating Arrangements for Drinks and Food, of which the following is a specification.

The invention relates to devices for refrigerating drink and food, and more particularly to a refrigerating-arrangement for beer- and wine-bottles, and the like. The invention consists in providing means wherein the bottle or vessel to be cooled is placed into an as close as possible fitting receptacle of sheet-metal or clay, or the like, and in which refrigerant is caused to circulate in a long spiral stream way around the liquid, or food contained in the said bottle or receptacle.

Figure 2:
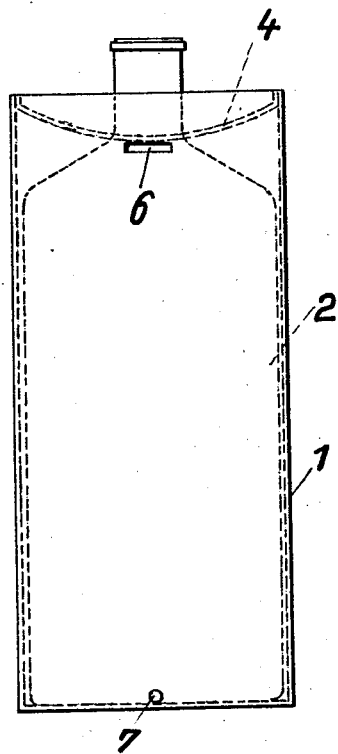
Figure 3:
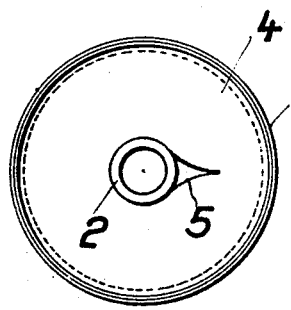

An example of applying the invention is illustrated in the drawing, in which:

Figure 1 is a longitudinal section,

Figure 2 a front elevation, and

Figure 3 a plan.

In Figures 1 and 2 a container 1 made of sheet metal, clay or other desirable material is shown and 2 indicates a bottle containing the liquid to be refrigerated. The container is provided with the internal spiral ribs 3. The inserted or hinged lid 4 is dished downwardly towards the inside of the container and provided with an aperture 5 for passage of the dripping water. Pieces of ice may be laid into the hollow of the lid, so that the ice flows slowly off around the bottle in a long continuous stream. One or more small apertures 7 are provided at the lower part of the receptacle for partly discharging the refrigerating liquid, while one or more larger openings 6 are provided at the upper part for overflow of the water.

The ice water or refrigerant is thereby set in motion in a continuous spiral stream and the refrigerating or cooling effected greatly enhanced.

Claims:

1. A bottle cooler comprising a container provided with a spiral rib on its inner wall, said container adapted to receive a bottle the walls of which lie in close contact with said rib, and an ice tray for the container supported above the bottle whereby water from the ice drips upon the bottle and is directed by said rib in a spiral path around the wall thereof.

2. A bottle cooler comprising a container having an aperture in the lower portion thereof and provided with a spiral rib on its inner wall, said container adapted to receive a bottle in close contact with said rib, and a perforated ice tray supported in the top of the container whereby water from the ice drips upon the bottle and is directed downwardly around the bottle in a spiral path discharging from said lower aperture.

3. The combination with a bottle, of a container therefor, said container being provided with a spiral rib on its inner wall in close contact with the wall of the bottle, and an ice tray supported by the container above the bottle whereby water from the ice drips upon the bottle and is directed by the rib downwardly in a spiral path around the bottle in contact with the walls thereof.

In testimony whereof I affix my signature in presence of two witnesses.

ALBERT BLOM.

Witnesses:
E. VHPPIL,
S. HOLGERAND.